(12) United States Patent
Curran

(10) Patent No.: US 9,397,717 B2
(45) Date of Patent: Jul. 19, 2016

(54) ELECTRONIC DEVICE GRIPPING SYSTEM

(71) Applicant: John S. Curran, Pasadena, CA (US)

(72) Inventor: John S. Curran, Pasadena, CA (US)

( * ) Notice: Subject to any disclaimer, the term of this patent is extended or adjusted under 35 U.S.C. 154(b) by 198 days.

(21) Appl. No.: 14/259,691

(22) Filed: Apr. 23, 2014

(65) Prior Publication Data

US 2015/0312389 A1    Oct. 29, 2015

(51) Int. Cl.
*H04M 1/02* (2006.01)
*H04B 1/3827* (2015.01)

(52) U.S. Cl.
CPC ............ *H04B 1/385* (2013.01); *H04M 1/0281* (2013.01); *H04B 2001/3861* (2013.01)

(58) Field of Classification Search
CPC ............... H04M 1/0281; H04B 1/385; H04B 2001/3861
USPC ........................................ 455/575.6
See application file for complete search history.

(56) References Cited

U.S. PATENT DOCUMENTS

| | | |
|---|---|---|
| D467,828 S | 12/2002 | Jones |
| 8,480,144 B2 | 7/2013 | Potter et al. |
| 8,528,798 B2 | 9/2013 | Chen |
| 2011/0266316 A1 | 11/2011 | Ghalib et al. |
| 2011/0309117 A1 | 12/2011 | Roberts |
| 2012/0031937 A1 | 2/2012 | Baker |
| 2013/0119099 A1 | 5/2013 | Interdonato |
| 2013/0146625 A1* | 6/2013 | Karle ............... A45F 5/00 224/217 |
| 2013/0240580 A1 | 9/2013 | Yu |
| 2013/0279098 A1* | 10/2013 | Cho ............... H05K 7/00 361/679.01 |
| 2014/0364176 A1* | 12/2014 | Pintor ............ H04B 1/385 455/575.6 |

FOREIGN PATENT DOCUMENTS

JP        2013519339 A * 8/2012 ........... H04B 1/3888

* cited by examiner

*Primary Examiner* — Vladimir Magloire
*Assistant Examiner* — Erica Navar (57) ABSTRACT

An electronic device gripping system allows a user to securely and comfortably hold a portable electronic device using one or more fingers. The system includes a base member having a first surface, a second surface, and a perimeter edge coupled to and extending between the first surface and the second surface. A finger securement member is coupled to the first surface of the base member and receives a finger of a user therein. A connector is coupled to the base member and couples the base member to a cell phone.

14 Claims, 7 Drawing Sheets

ELECTRONIC DEVICE GRIPPING SYSTEM

BACKGROUND OF THE DISCLOSURE

1. Field of the Disclosure

The disclosure relates to gripping aid systems and more particularly pertains to a new gripping aid system for allowing a user to securely and comfortably hold a portable electronic device using one or more fingers.

2. Summary of the Disclosure

An embodiment of the disclosure meets the needs presented above by generally comprising a base member having a first surface, a second surface, and a perimeter edge coupled to and extending between the first surface and the second surface. A finger securement member is coupled to the first surface of the base member and receives a finger of a user therein. A connector is coupled to the base member and couples the base member to a cell phone.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 7 thereof, a new gripping aid system embodying the principles and concepts of an embodiment of the disclosure and generally designated by the reference numeral 10 will be described.

As best illustrated in FIGS. 1 through 7, the electronic device gripping system 10 generally comprises a base member 12 having a first surface 14, a second surface 16, and a perimeter edge 18 coupled to and extending between the first surface 14 and the second surface 16. The first surface 14 of the base member 12 may have a depression 20 extending therein. The first surface 14 of the base member 12 may also have a track 22 extending downwardly therein.

Figure 6:
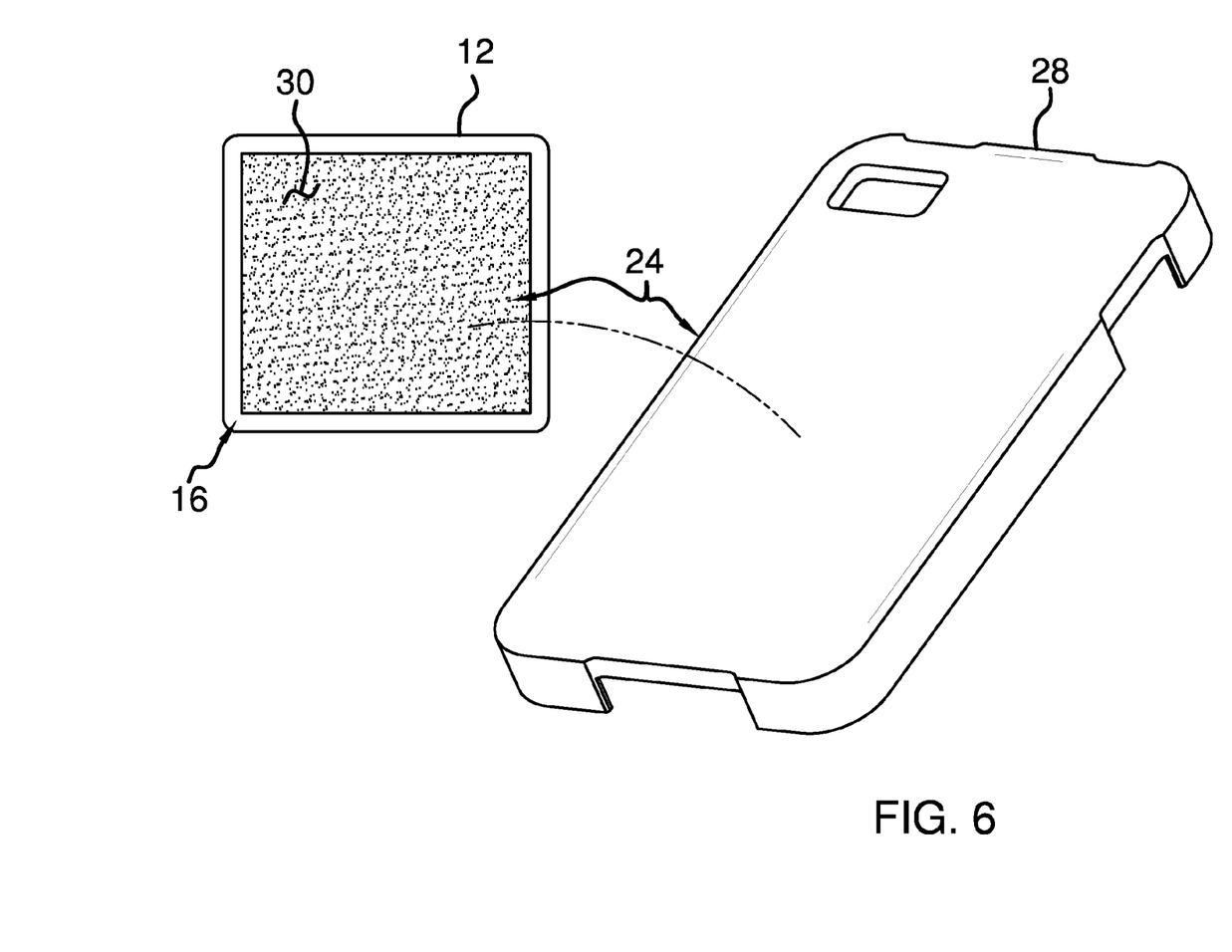
FIG. 6 is a view of the second surface of the base member showing the adhesive for connecting the base member to the case or directly to a back surface of the cell phone.

A connector 24 is coupled to the base member 12. The connector 24 is configured for coupling the base member 12 to a portable electronic device 26, such as a cell phone 27, tablet or the like. The connector 24 may comprise a case 28 coupled to the second surface 16 of the base member 12. The case 28 is configured for coupling to and encasing the portable electronic device 26 whereby the base member 12 is coupled to the portable electronic device 26. Alternatively, the connector 24 may be an adhesive 30 positioned on the second surface 16 of the base member 12. The adhesive 30 is configured for abutting and adhering to the portable electronic device 26. The connector 24 may comprise both the case 28 and the adhesive 30 such that the base member 12 attaches to the case 28 using the adhesive 30, as shown in FIG. 6.

A finger securement member 32 is coupled to the first surface 14 of the base member 12. The finger securement member 32 is configured to receive a finger 34 of a user therein. The finger securement member 32 may comprise a ring 36 that may be comprised of an elastomeric material, such as rubber or the like. The finger securement member 32 is movable relative to the base member 12. More particularly, the finger securement member 32 may be pivotal relative to the base member 12 such that the finger securement member 32 is pivotal into and out of the depression 20. The finger securement member 32 may be positioned flush with respect to the first surface 14 of the base member 12 when the finger securement member 32 is positioned in the depression 20. A locking member 40 is coupled to the base member 12. The locking member 40 is engageable with the finger securement member 32 to retain the finger securement member 32 within the depression 20. The locking member 40 may be slidable relative to the base member 12 such that the locking member 40 can slide over the finger securement member 32 to retain the finger securement member 32 within the depression 20. The locking member 40 may include ridges 41 to facilitate sliding of the locking member 40.

The finger securement member 32 includes a post 42 that is slidable within the track 22 such that the finger securement member 32 is movable to a selectable location within the track 22. The post 42 has a bottom end 44 and a rivet 46 may be attached to the bottom end 44. The rivet 46 is positionable in the track 22 to engage the track 22 and permit the finger securement member 32 to move along a length of the track 22. The finger securement member 32 may be removably positionable in the track 22. More particularly, the track 22 may have a first free end 50 and a second free end 52. The second free end 52 has a greater size than the rivet 46 such that the moving the finger securement member 32 to the second free end 52 permits removal of the finger securement member 32 from the track 22.

As shown in the Figures, the finger securement member 32 may be one of a plurality of finger securement members 32. For relatively small electronic devices 26 such as a cell phone 27, a single finger securement member 32 may suffice. However, for larger electronic devices 26, such as laptops, tablets or the like, two or three finger securement devices 32 may be used in order to more comfortably support the weight of the larger electronic device 26 on the user's fingers 34.

Figure 1:
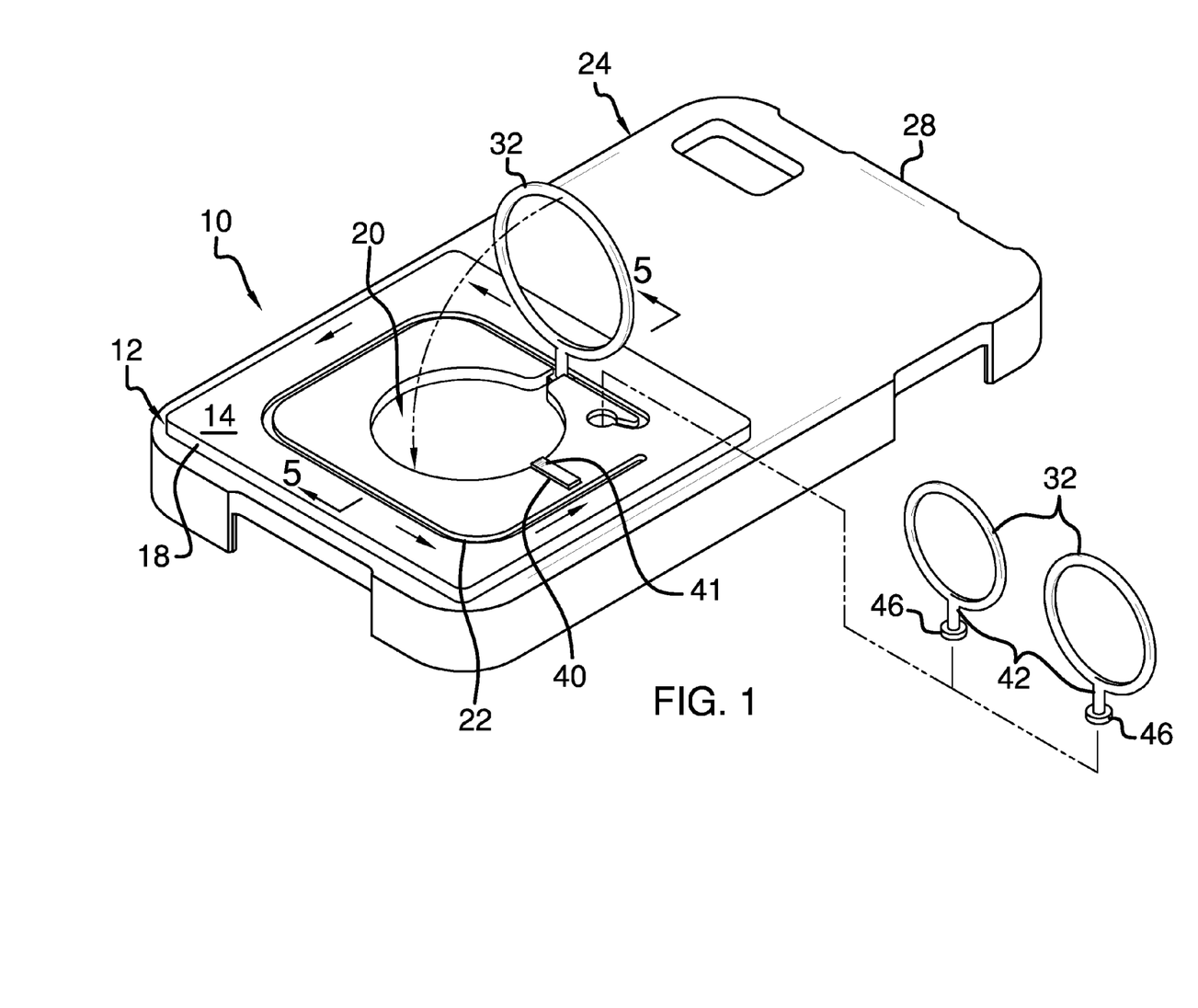
FIG. 1 is a rear side perspective view of an electronic device gripping system according to an embodiment of the disclosure.
Figure 2:
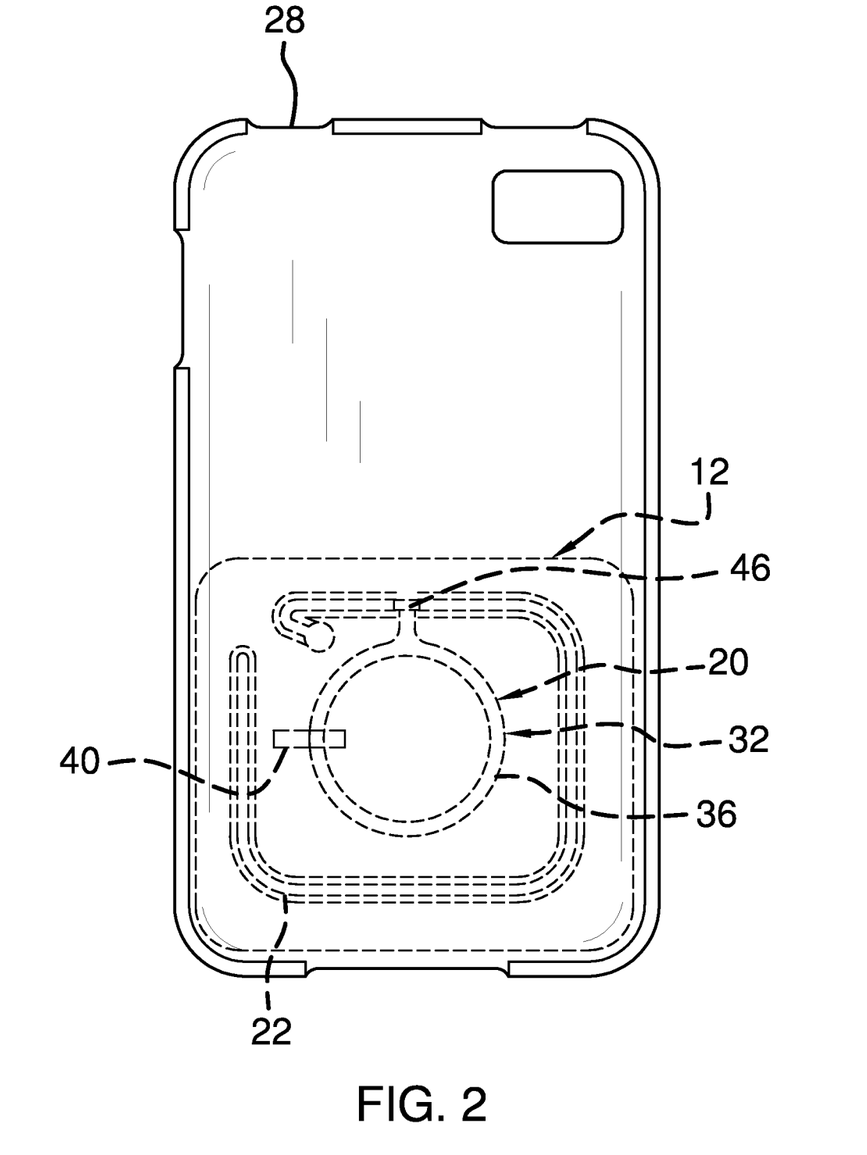
FIG. 2 is a front view of an embodiment of the disclosure.
Figure 3:
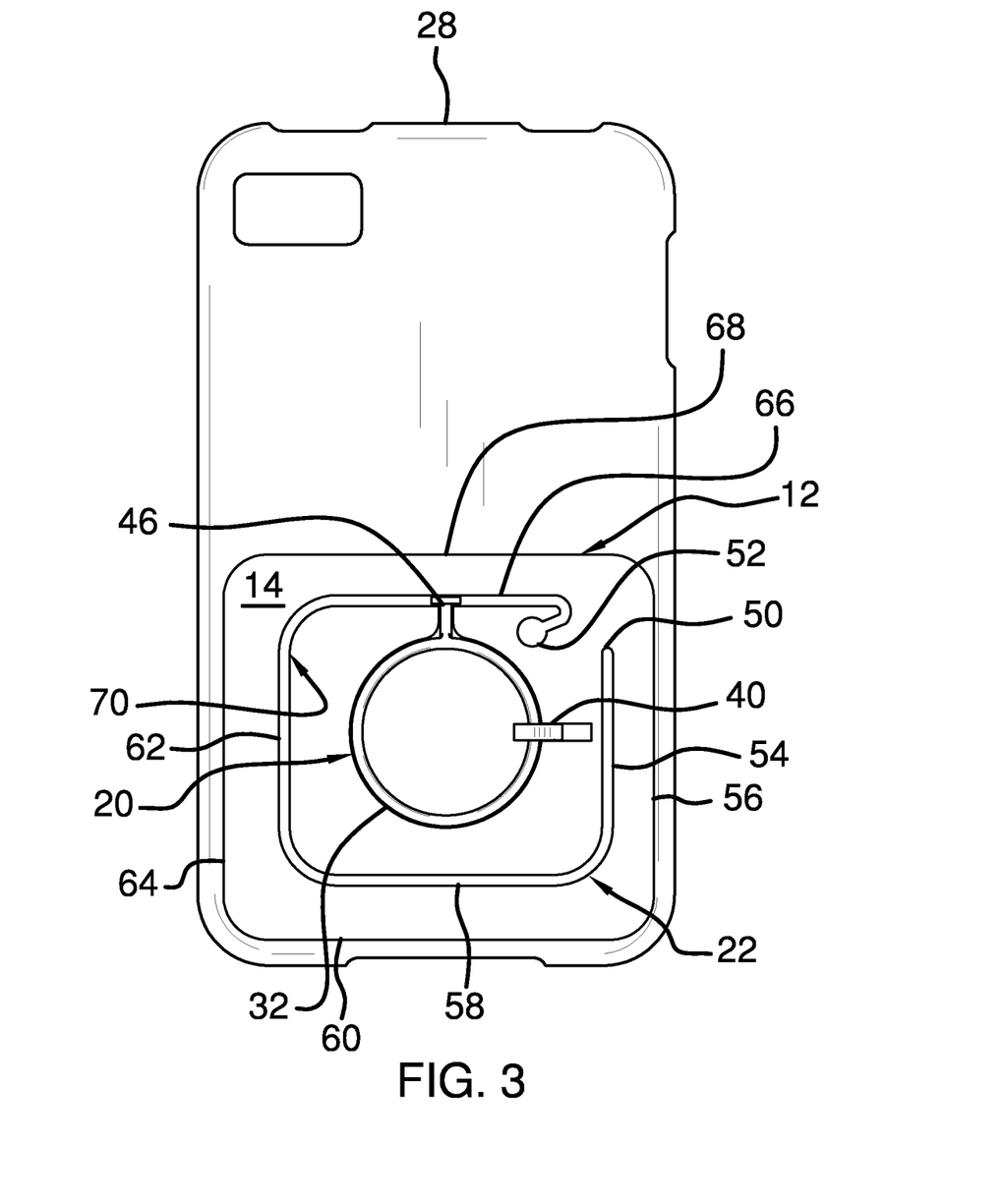
FIG. 3 is a rear view of an embodiment of the disclosure.
Figure 4:
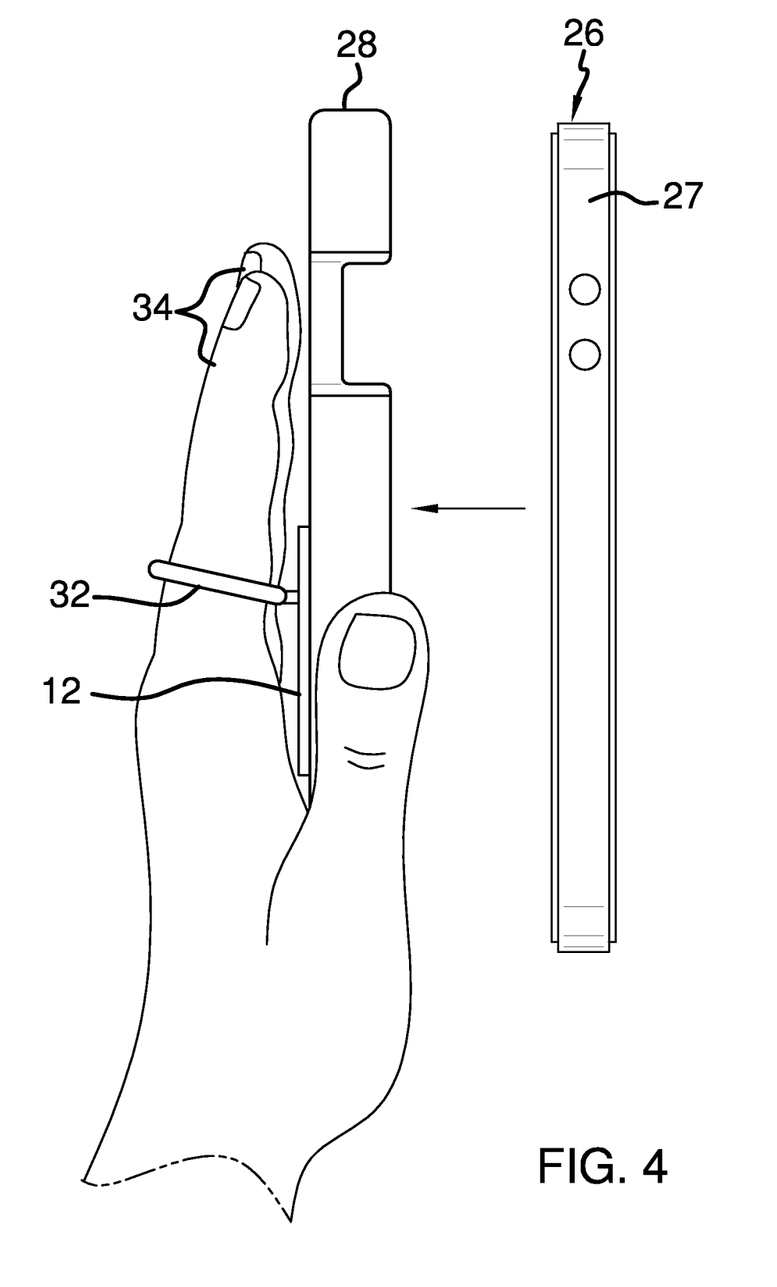
FIG. 4 is an in-use side view of an embodiment of the disclosure.
Figure 5:
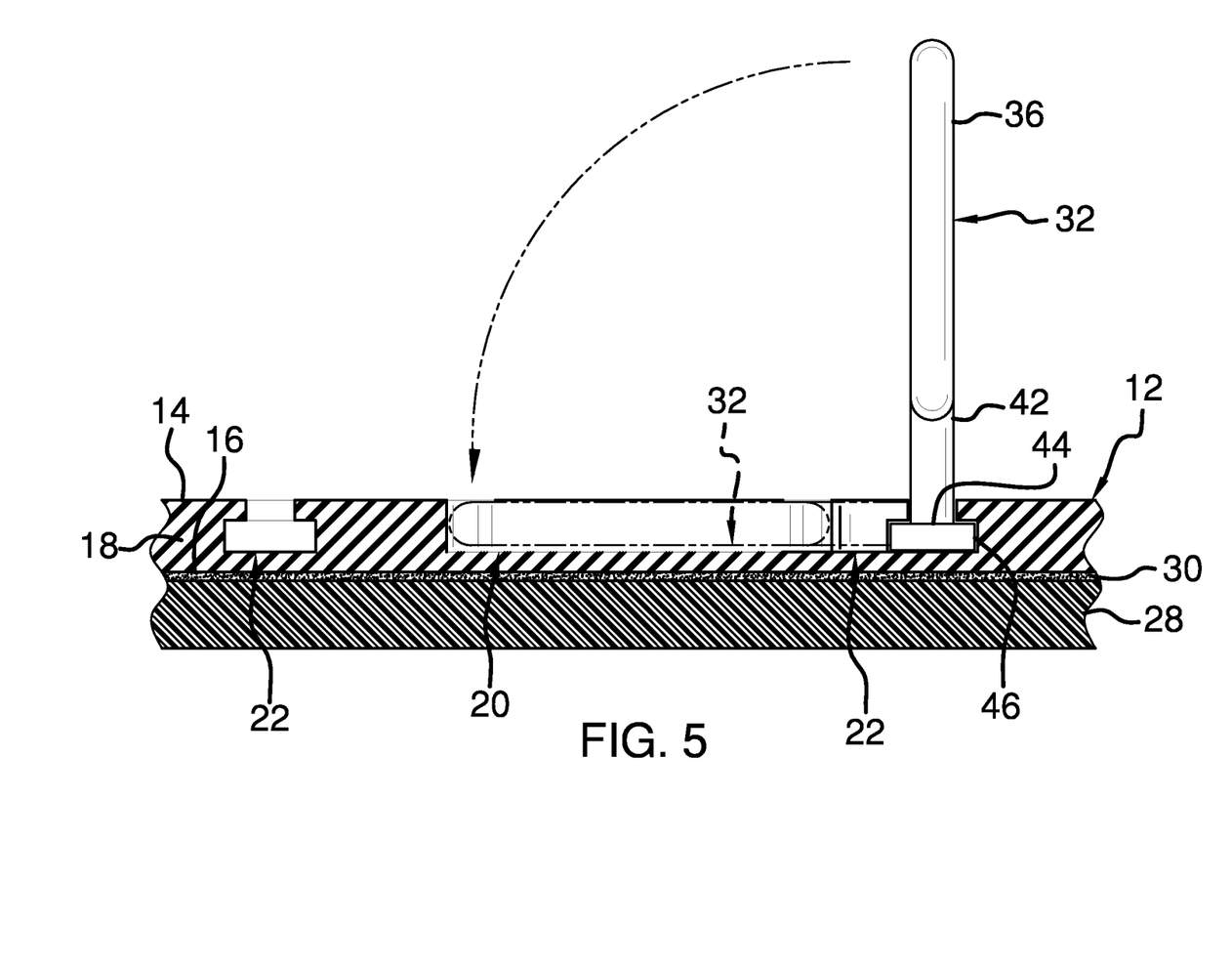
FIG. 5 is a cross-sectional view of an embodiment of the disclosure taken along line 5-5 of FIG. 1.
Figure 7:
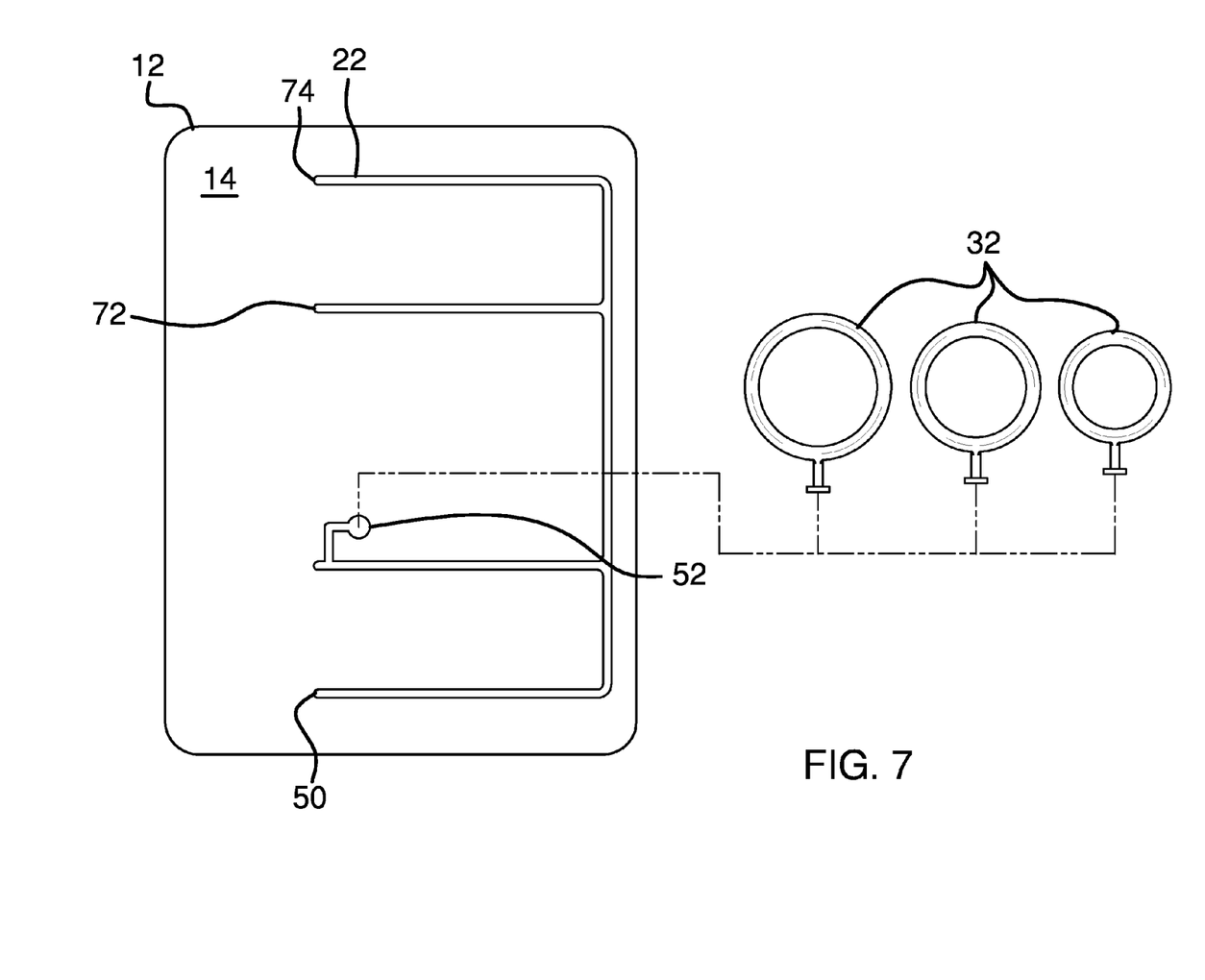
FIG. 7 is a view of the first surface of a base member of an alternative embodiment of the disclosure.

The track 22 may have various configurations depending on the size and weight of the electronic device 26 to which the base member 12 is coupled. As shown in FIGS. 1-3, the track 22 may include a first section 54 positioned adjacent to a first side 56 of the perimeter edge 18 of the base member 12, a second section 58 positioned adjacent to a second side 60 of the perimeter edge 18 of the base member 12, a third section 62 positioned adjacent to a third side 64 of the perimeter edge 18 of the base member 12, and a fourth section 66 positioned adjacent to a fourth side 68 of the perimeter edge 18 of the base member 12. Each of the first 54, second 58, third 62 and fourth 66 sections of the track 22 may form a substantially rectangular shape around the perimeter edge 18 of the base member 12. The second free end 52 of the track 22 may extend from the fourth section 66 of the track 22 inwardly toward an interior edge 70 of the track 22. As shown in FIG. 7, instead of having a rectangular-type configuration, the track 22 may instead include a third free end 72 and a fourth free end 74, providing various directions of movement for the finger securement members 32 within the track 22. This alternative embodiment is particularly useful for larger electronic devices 26, such as tablets, laptops and the like.

In use, the desired connector 24 is used to couple the base member 12 to the electronic device 26. As described above, the connector 24 may include the case 28, the adhesive 30 or both. One or more finger securement members 32 is positioned in the track 22. A user inserts a finger 34 into each of the finger securement members 32 and uses his or her finger 34 to slide the finger securement member 32 where desired. This allows the user to securely hold the electronic device 26 with one or more fingers 34 while being able to easily move the electronic device 26 into a comfortable position for use of the electronic device 26. The configuration of the track 22 within the base member 12 permits the user to hold the electronic device 26 in a horizontal or vertical orientation or at any desired intermediate angle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic gripping system comprising:
   a base member having a first surface, a second surface, and a perimeter edge coupled to and extending between said first surface and said second surface, said first surface of said base member having a track extending downwardly therein;
   a finger securement member coupled to said first surface of said base member, said finger securement member being configured to receive a finger of a user therein, said finger securement member being movable relative to said base member, said finger securement member including a post being slidable within said track such that said finger securement member is movable to a selectable location within said track, said post having a bottom end, a rivet being attached to said bottom end of said post, said rivet being positionable in said track to engage said track and permit said finger securement member to move along a length of said track, said finger securement member being removably positionable in said track, said track having a first free end and a second free end, said second free end having a greater size than said rivet such that said moving said finger securement member to said second free end permits removal of said finger securement member from said track;
   a connector coupled to said base member, said connector being configured for coupling said base member to a cell phone;
   said track including a first section positioned adjacent to a first side of said perimeter edge of said base member, a second section positioned adjacent to a second side of said perimeter edge of said base member, a third section positioned adjacent to a third side of said perimeter edge of said base member, and a fourth section positioned adjacent to a fourth side of said perimeter edge of said base member; and
   each of said first, second, third and fourth sections of said track forming a substantially rectangular shape around said perimeter edge of said base member.

2. The system of claim 1, further comprising wherein said finger securement member comprises a ring.

3. The system of claim 1, further comprising wherein said finger securement member is comprised of an elastomeric material.

4. The system of claim 1, further comprising said finger securement member being pivotal relative to said base member.

5. The system of claim 4, further comprising wherein said first surface of said base member has a depression extending therein, said finger securement member being pivotal into and out of said depression.

6. The system of claim 5, further comprising said finger securement member being positioned flush with respect to said first surface of said base member when said finger securement member is positioned in said depression.

7. The system of claim 5, further comprising a locking member coupled to said base member, said locking member being engageable with said finger securement member to retain said finger securement member within said depression.

8. The system of claim 1, further comprising said connector being a case coupled to said second surface of said base member, said case being configured for coupling to and encasing the cell phone whereby said base member is coupled to the cell phone.

9. The system of claim 1, further comprising said connector being an adhesive positioned on said second surface of said base member, said adhesive being configured for abutting and adhering to the cell phone.

10. The system of claim 1, further comprising said finger securement member being one of a plurality of said finger securement members.

11. The system of claim 1, further comprising wherein said second free end of said track extends from said fourth section of said track inwardly toward an interior edge of said track.

12. An electronic gripping system comprising:
   a base member having a first surface, a second surface, and a perimeter edge coupled to and extending between said first surface and said second surface, said first surface of said base member having a depression extending therein, said first surface of said base member having a track extending downwardly therein;

a finger securement member coupled to said first surface of said base member, said finger securement member being configured to receive a finger of a user therein, said finger securement member comprising a ring, said finger securement member being comprised of an elastomeric material, said finger securement member being movable relative to said base member, said finger securement member being pivotal relative to said base member, said finger securement member being pivotal into and out of said depression, said finger securement member being positioned flush with respect to said first surface of said base member when said finger securement member is positioned in said depression, said finger securement member including a post being slidable within said track such that said finger securement member is movable to a selectable location within said track, said post having a bottom end, a rivet being attached to said bottom end of said post, said rivet being positionable in said track to engage said track and permit said finger securement member to move along a length of said track, said finger securement member being removably positionable in said track;

said track having a first free end and a second free end, said second free end having a greater size than said rivet such that said moving said finger securement member to said second free end permits removal of said finger securement member from said track;

a locking member coupled to said base member, said locking member being engageable with said finger securement member to retain said finger securement member within said depression;

a connector coupled to said base member, said connector being configured for coupling said base member to a cell phone;

wherein said finger securement member is one of a plurality of said finger securement members;

said track including a first section positioned adjacent to a first side of said perimeter edge of said base member, a second section positioned adjacent to a second side of said perimeter edge of said base member, a third section positioned adjacent to a third side of said perimeter edge of said base member, and a fourth section positioned adjacent to a fourth side of said perimeter edge of said base member; and each of said first, second, third and fourth sections of said track forming a substantially rectangular shape around said perimeter edge of said base member.

13. The system of claim 12, further comprising said connector being a case coupled to said second surface of said base member, said case being configured for coupling to and encasing the cell phone whereby said base member is coupled to the cell phone.

14. The system of claim 12, further comprising said connector being an adhesive positioned on said second surface of said base member, said adhesive being configured for abutting and adhering to the cell phone.

* * * * *